US010153472B2

(12) United States Patent
Li et al.

(10) Patent No.: US 10,153,472 B2
(45) Date of Patent: Dec. 11, 2018

(54) MICROPOROUS MEMBRANE OF POLYETHYLENE-BASED COMPOSITE MATERIAL AND PREPARATION METHOD THEREOF

(71) Applicant: TIANJIN DG MEMBRANE TECHNOLOGY CO., LTD., Tianjin (CN)

(72) Inventors: Xin Li, Tianjin (CN); Jianhua Li, Tianjin (CN); Yongjun Jiao, Tianjin (CN); Long Li, Tianjin (CN); Wei Chen, Tianjin (CN); Xinjian Deng, Tianjin (CN)

(73) Assignee: TIANJIN DG MEMBRANE TECHNOLOGY CO., LTD., Tianjin (CN)

( * ) Notice: Subject to any disclaimer, the term of this patent is extended or adjusted under 35 U.S.C. 154(b) by 887 days.

(21) Appl. No.: 14/311,394

(22) Filed: Jun. 23, 2014

(65) Prior Publication Data

US 2014/0335421 A1 Nov. 13, 2014

Related U.S. Application Data

(63) Continuation-in-part of application No. PCT/CN2012/071137, filed on Feb. 14, 2012.

(30) Foreign Application Priority Data

Dec. 22, 2011 (CN) .......................... 2011 1 0445886

(51) Int. Cl.
H01M 2/16 (2006.01)
H01M 10/0525 (2010.01)
(Continued)

(52) U.S. Cl.
CPC ...... *H01M 2/1673* (2013.01); *B01D 67/0018* (2013.01); *B01D 71/26* (2013.01);
(Continued)

(58) Field of Classification Search
CPC .. H01M 2/1673; H01M 2/145; H01M 2/1653; H01M 10/0525
(Continued)

(56) References Cited

U.S. PATENT DOCUMENTS 5,641,565 A * 6/1997 Sogo .......................... C08J 9/26
204/295
2002/0105623 A1* 8/2002 Pinhanez ............... G03B 21/28
353/69
(Continued)

Primary Examiner — Osei K Amponsah
(74) Attorney, Agent, or Firm — Matthias Scholl P.C.; Matthias Scholl

(57) ABSTRACT

A microporous membrane of a polyethylene-based composite material, including high density and high crystallinity of polyethylene as a base material. The polyethylene is modified by a modifying agent accounting for 10-25 wt. % of the membrane and including a moderate molecular weight of rubber selected from polyisobutylene (PIB), ethylene-propylene methylene copolymer (EPM), or a mixture thereof, the rubber having a dynamic viscosity of between 50 and 2000 Pa·S at 100° C. and a weight average molecular weight of between 90,000 and 250,000. The modified polyethylene is dissolved in a solvent and a pore-forming agent for pore formation.

9 Claims, 2 Drawing Sheets

(51) Int. Cl.
*H01M 2/14* (2006.01)
*B01D 71/26* (2006.01)
*B01D 67/00* (2006.01)
*C08J 9/00* (2006.01)
*C08J 9/28* (2006.01)

(52) U.S. Cl.
CPC ............ *C08J 9/0061* (2013.01); *C08J 9/283* (2013.01); *H01M 2/145* (2013.01); *H01M 2/1653* (2013.01); *H01M 10/0525* (2013.01); *B01D 2323/06* (2013.01); *B01D 2325/24* (2013.01); *C08J 2201/03* (2013.01); *C08J 2201/0502* (2013.01); *C08J 2205/044* (2013.01); *C08J 2323/06* (2013.01); *C08J 2400/26* (2013.01); *C08J 2423/16* (2013.01); *C08J 2423/22* (2013.01)

(58) Field of Classification Search
USPC ........................................................ 429/246
See application file for complete search history.

(56) References Cited

U.S. PATENT DOCUMENTS

| | | | |
|---|---|---|---|
| 2006/0078791 A1* | 4/2006 | Hennige | H01M 2/1646 429/145 |
| 2011/0027660 A1* | 2/2011 | Takeda | C08J 5/18 429/254 |

\* cited by examiner

MICROPOROUS MEMBRANE OF POLYETHYLENE-BASED COMPOSITE MATERIAL AND PREPARATION METHOD THEREOF

CROSS-REFERENCE TO RELATED APPLICATIONS

This application is a continuation-in-part of International Patent Application No. PCT/CN2012/071137 with an international filing date of Feb. 14, 2012, designating the United States, now pending, and further claims priority benefits to Chinese Patent Application No. 201110445886.7 filed Dec. 22, 2011. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a microporous membrane of polyethylene-based composite material for lithium ion batteries and a preparation method thereof.

Description of the Related Art

Typical commercial polyolefin microporous membranes include: a three-layer of PP/PE/PP composite membrane prepared by a dry method, a single layer of PE membrane having a large molecule weight prepared by a wet method, and a microporous physical gel membrane prepared by a solvent-induced phase separation method. A typical microporous physical gel membrane is a polyvinylidene-fluoride-hexafluoro propylene (PVDF-HFP) copolymer microporous physical gel membrane prepared by Bellcore process. The micropores of the PVDF-HFP gel membrane have slightly large pore size, approximately between 0.5 and 2 µm; and the membrane is not strengthened by hot stretching, thus, the mechanical strength of the membrane is low and is not applicable to process requirements like winding.

The three-layer of PP/PE/PP composite membrane prepared by the wet method has the following shortages:

1. The strength and toughness of the membrane are not good. The membrane is prone to be torn in a transverse direction, and the transverse elongation at break is smaller than 20%.

2. Although the middle microporous layer employs PE that has the shutdown ability at a high temperature of between 135 and 145° C., the fusion point thereof is limited and drawbacks of large thermal shrinkage and insufficient high temperature rupture resistance still exist in the hot stretched PP microporous layers at the temperature of 130° C.

3. Compared with the PVDF-HFP physical gel membrane or the coated membrane, the membrane prepared by the dry method has low bonding capability with the electrode pieces during the hot press.

The existing PE membrane prepared by the wet method has the following disadvantages:

1. During the preparation, the polyethylene powder having a large molecular weight and a high density is mixed with the high temperature compatilizer, i. e., the liquid paraffin oil, heated and blended. However, the fluctuation exists in the solid content of the slurry, the stability of the feeding and the consistency in the melt content are not good. The stability and the consistency of the product are affected.

2. Because the hot stretching strengthening process is employed, the thermal shrinkage is slightly large at the high temperature of 120° C. above, and the safety of the battery cannot be ensured.

3. Compared with the PVDF-HFP physical gel membrane or the coated membrane, the PE membrane prepared by the wet method is also lack of the bonding capability with the electrode pieces, the elasticity in the thickness direction, or the stress absorption capability. The PE membrane prepared by the wet method cannot meet the demands of the power battery on aspects of the safety and the cycle life.

SUMMARY OF THE INVENTION

In accordance with one embodiment of the invention, there is provided a microporous membrane of a polyethylene-based composite material, comprising high density and high crystallinity of polyethylene as a base material. The polyethylene is modified by a modifying agent accounting for 10-25 wt. % of the membrane and comprising a moderate molecular weight of rubber selected from polyisobutylene (PIB), ethylene-propylene methylene copolymer (EPM), or a mixture thereof, the rubber having a dynamic viscosity of between 50 and 2000 Pa·S at 100° C. and a weight average molecular weight of between 90,000 and 250,000. The modified polyethylene is dissolved in a solvent and pore-forming agent for pore formation based on a principle of liquid-liquid phase separation of thermally induced phase separation, the solvent and pore-forming agent employing an aliphatic dibasic acid ester having a flash point of exceeding 210° C. and being selected from dioctyl sebacate (DOS), dioctyl azelate (DOZ), diisodecyl adipate (DIDA), or a mixture thereof; micropores on two sides of the membrane is asymmetric, the micropores on one side are fine and compact, and the micropores on the other side are dendroid gross pores. The microporous membrane is adapted to be hot pressed with a positive pole piece at a temperature of 110-120° C. and a pressure of 1-2.5 MPa for 1-15 min to form a bonding body having a peel strength of exceeding 0.03 N/20 mm and a thermal contraction of less than 10% at 130° C. within 30 min.

Conventional PE microporous membrane prepared by a wet method with paraffin oil as compatilizer has an average pore size of less than 70 nm, and cannot be bonded with pole pieces by thermal pressing. If extraordinarily high temperature is employed to thermally press the membrane, the pore size of the resulting membrane becomes smaller, thereby resulting in high internal resistance of batteries, which is unacceptable. The membrane of a polyethylene-based composite material of the invention has asymmetric micropores on two sides and relatively large average pore size, and is prepared based on the principle of liquid-liquid phase separation of thermally induced phase separation. The high temperature compatilizer is an aliphatic dibasic acid ester having a flash point of exceeding 210° C. and being selected from dioctyl sebacate (DOS), dioctyl azelate (DOZ), diisodecyl adipate (DIDA), or a mixture thereof, rather than paraffin oil. The aliphatic dibasic acid ester is thermodynamically compatible with polyethylene at 180-210° C. The employment of the aliphatic dibasic acid ester having a flash point of exceeding 210° C. can effectively prevent the formation of large-sized pores and bubbles in the high temperature melt, thereby ensuring the production safety. The aliphatic dibasic acid ester is also thermodynamically compatible with polyisobutylene (PIB) and ethylene-propylene methylene copolymer at 90-120° C., which can be kneaded at high temperature to yield a uniform hot melt adhesive. The hot melt adhesive, the high molecular weight polyethylene powder, and the high temperature liquid compatilizer are dispersed at 90-120° C. to yield liquid-solid two phase flow slurry having a certain viscosity and settlement resistance, which is conducive to feeding the materials to the extruder stably and uniformly.

Apart from employing the aliphatic dibasic acid ester as the high temperature compatilizer, two sides of the melt are cooled by asymmetric cooling. Conventional membrane casting employs a single mirror cooling roll. In this invention, the melt is extruded and cooled on the surface of chill rolls using asymmetrical cooling process to yield casting pieces having different cooling temperature. Specifically, the winding length of one surface of the melt on a secondary chill roll is controlled to be smaller than that of the other surface of the melt on a main chill roll, or the temperature and flow rate of the cooling medium in the main and secondary chill rollers are controlled to be different. Thus, the micropores on two opposite sides of the membrane are asymmetric, the micropores on one side are fine and compact, and the micropores on the other side are dendroid gross pores. Preferably, the average pore size of the membrane is 80-300 nm, the porosity of 40-75%, particularly 50-65%, the initial Gurley value of between 30 s/100 cc and 400 s/100 cc. After being hot pressed under a pressure of 1-2.5 MPa at a temperature of 110-120° C., the microporous membrane still has low resistance.

High density polyethylene has a relatively high crystallinity and thus tends to form a microfiber organization upon thermal stretching. Thus, the PE membrane has much higher tensile strength than the PVDF-HFP gel membrane. The latent heat of fusion of the PE microporous membrane prepared by a wet method is generally more than 220 J/g. In the invention, the latent heat of fusion of the microporous membrane is between 150 and 195 J/g. The melting point of the membrane is between 130 and 145° C., the thickness is between 20 and 50 μm, particularly between 25 and 35 μm. The porosity is preferably between 50 and 65%, which ensures the internal resistance of the battery is still low even by the treatment of thermal pressing. The content of amorphous rubber in the membrane is controlled between 10 and 25 wt. %, which takes into account both the thermal bonding ability and the tensile strength of the membrane. If the rubber percentage is too low, the thermal bonding ability is poor. If the rubber percentage is too high, the mechanical strength of the membrane is significantly reduced. The polyethylene as the base material is a high molecular weight of polyethylene or ultra-high molecular weight of polyethylene having a high density, a latent heat of fusion of between 200-250 J/g, and a weight average molecular weight of between 500,000 and 5,000,000, particularly between 1,000,000 and 3,000,000, which is thermally stretched at 105-128° C. by 4-7 folds along mechanical direction and by 2-6 folds along transverse direction, a longitudinal tensile strength is controlled to exceed 70 MPa, and a transversal elongation at break to exceed 100%. Thus, a membrane having high safety, strong squeezing, needling, short circuit resistance is obtained.

A method for preparing a microporous membrane of a polyethylene-based composite material using a thermally induced phase separation technology, the method employing high density and high crystallinity of polyethylene as a base material, employing amorphous polyisobutylene (PIB) rubber and/or ethylene-propylene methylene copolymer (EPM) rubber which are compatible with polyethylene to provide thermo-compression bonding capacity, employing an aliphatic dibasic acid ester having a flash point of exceeding 210° C. and being selected from dioctyl sebacate (DOS), dioctyl azelate (DOZ), diisodecyl adipate (DIDA), or a mixture thereof as a high temperature compatilizer, controlling different cooling velocity of two opposite sides of casting pieces to yield the membrane having asymmetric micropores at two sides, and the method comprising the following steps:

1) uniformly milling the rubber and the high temperature compatilizer at 90-120° C. to yield a hot melt adhesive A;

2) swelling and stirring polyethylene and the high temperature compatilizer at 90-120° C. for 1-24 hr to yield a slurry B;

3) uniformly mixing the hot melt adhesive A and the slurry B at 90-120° C., quantitatively feeding a resulting mixture to a twin screw extruder via a metering pump, milling at 180-210° C. to yield a thermodynamically uniform solution, and extruding the uniform solution to yield casting pieces;

4) quickly cooling the casting pieces on chill rolls using an asymmetric cooling process, controlling a winding length of one surface of the casting pieces on a secondary chill roll to be smaller than that of the other surface of the casting pieces on a main chill roll, or controlling temperatures and flow rates of a cooling medium in the main and secondary chill rollers to be different;

5) preheating the cooled casting pieces at 105-128° C. and thermally stretching the casting pieces in two directions to form a membrane, a longitudinal stretching ratio being 4-7 folds, and a transverse stretching ratio being 2-6 folds;

6) extracting and removing the high temperature compatilizer using a second solvent; and 7) thermally stretching the membrane for the adjustment of porosity, pore size, and thickness thereof, thermally shaping, and cooling to yield the microporous membrane of a polyethylene-based composite material.

The disclosure further provides a lithium ion battery, comprising a positive pole piece, a negative pole piece, an electrolyte, and a microporous membrane of a polyethylene-based composite material of any one of claims 1-7, wherein, prior to injecting the electrolyte, a pole group of the battery comprising the positive pole piece/the negative pole piece/the electrolyte is thermally pressed at 110-125° C. under a pressure of 1-2.5 MPa for 1-15 min. The thermally pressed membrane and the bump particles on the surface of the pole pieces form a mechanical embedment effect thereby preventing the thermal contraction of the membrane at 130° C. or even above and improving the safety. Compared with PE membrane prepared by wet method and PP/PE/PP membrane prepared by dry method, the microporous membrane of a polyethylene-based composite material has characteristics of thermo-compression bonding, just like the PVDF-HFP copolymer gel membrane, and solves the defect of thermal contraction of the thermally stretched polyolefin membrane. The amorphous rubber in the microporous membrane of a polyethylene-based composite material has capacity of absorption and swelling, which is conducive to the uniformity and cycle life of the battery.

For better understanding the invention, some explanations are given as follows. The rubber is selected from polyisobutylene (PIB), ethylene-propylene methylene copolymer (EPM), or a mixture thereof, and has a dynamic viscosity of between 50 and 2000 Pa·S at 100° C. and a weight average molecular weight of between 90,000 and 250,000, which meets the requirement for the preparation of the hot melt adhesive. If the molecular weight is too small or the dynamic viscosity is too low, the liquid-solid two-phase flow resulting from the mixture of the rubber and polyethylene powder is unstable, the power tends to precipitate, which adversely affects the uniformity of the membrane. Furthermore, too small molecular weight of the rubber is easy to be extracted with the high temperature compatilizer. Small molecular weight, low viscosity, or too much of the rubber each will result in the formation of closed pores when thermally stretching the polyethylene-based membrane at 105-128° C. If the rubber employs high molecular weight and high viscosity materials, the production process of the hot melt adhesive at 90-120° C. is very difficult to control. If the high molecular weight and high viscosity rubber is employed to modify the membrane, the thermal press temperature is required to be 128° C. or above, which is apt to break the polyethylene-based melt, adversely affect the thermal lamination of the microporous membrane and the pole pieces, thereby resulting in insufficient bonding force.

DETAILED DESCRIPTION OF THE EMBODIMENTS

Figure 1:
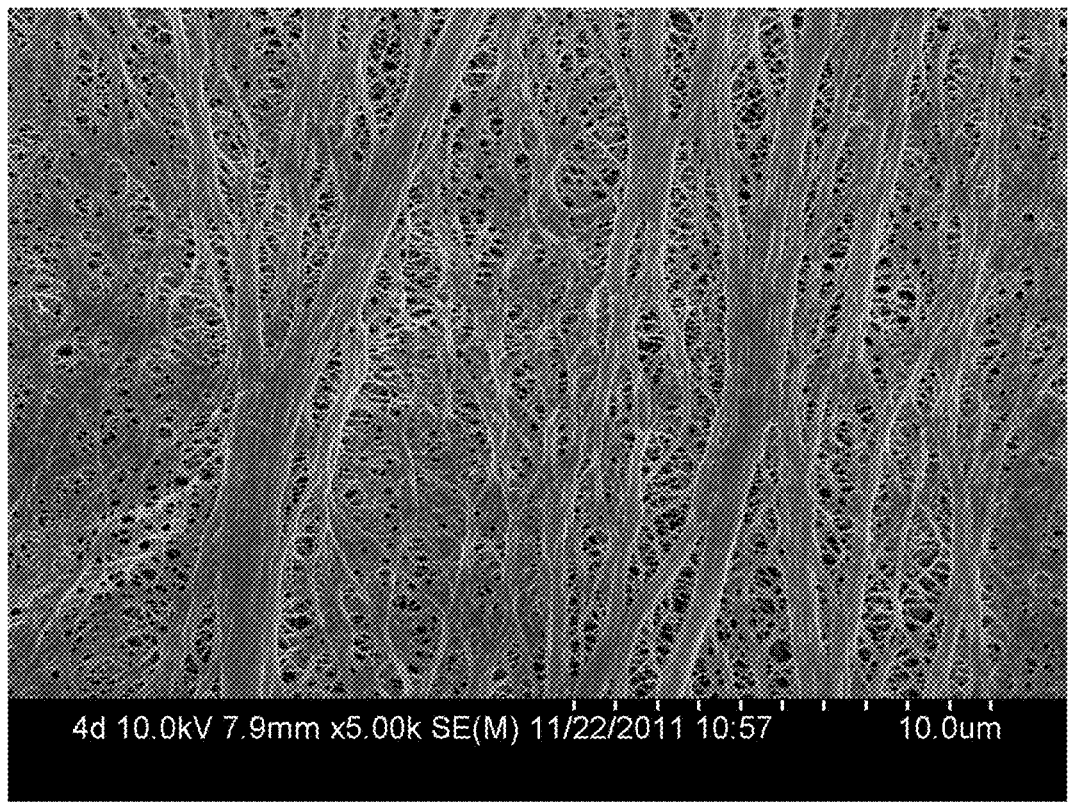
FIG. 1 is a physical appearance of one side of a microporous membrane of a polyethylene-based composite material having fine and small pores according to one embodiment of the invention.
Figure 2:
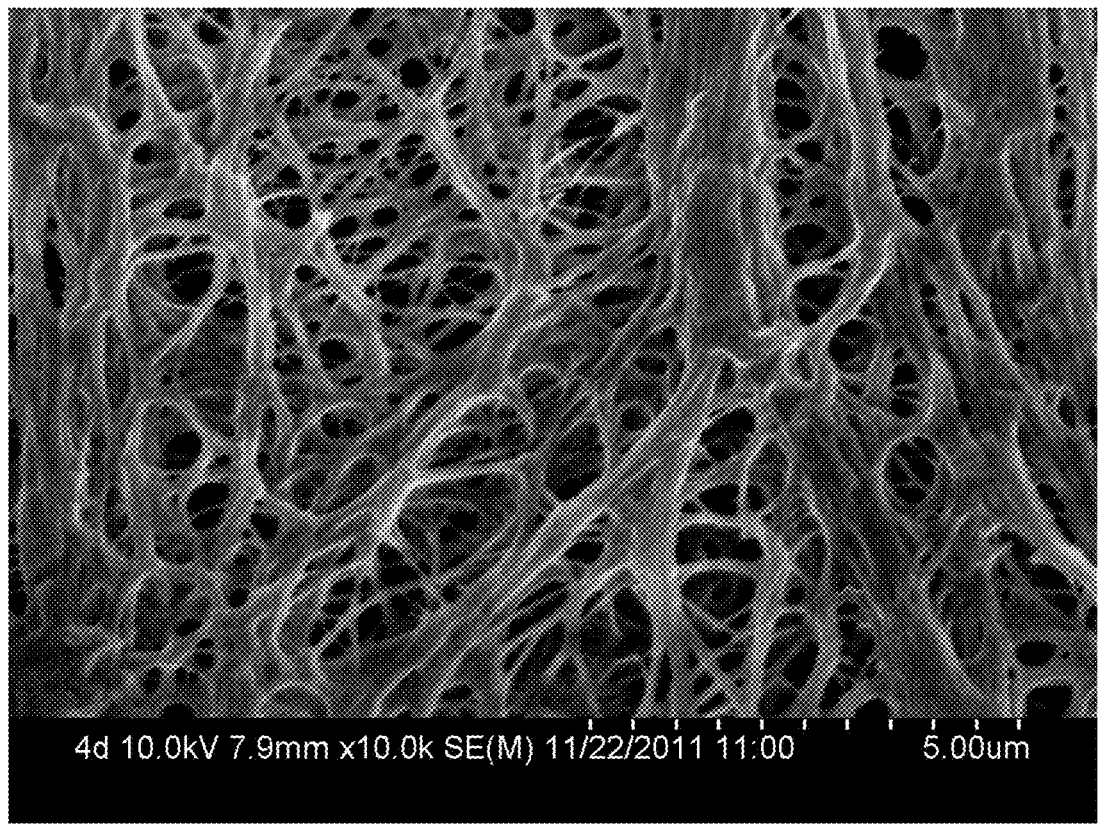
FIG. 2 is a physical appearance of another side of a microporous membrane of a polyethylene-based composite material having dendroid gross pores according to one embodiment of the invention.

For further illustrating the invention, experiments detailing a microporous membrane of a polyethylene-based composite material and a preparation method thereof are described hereinbelow combined with the drawings. It should be noted that the following examples are intended to describe and not to limit the invention.

Evaluation of Membrane Characteristics

1) Membrane Thickness (μm)

Precision Thickness Gauge CHY-C2 manufactured by Labthink Instruments Co., Ltd. is employed. The thickness of five randomly selected points on a sample (50 mm×50 mm) cut from the membrane is measured using the precision thickness gauge, and the average is recorded.

2) Degree of Aeration

The measurement on the degree of aeration of the membrane is carried out according to the standard JIS P8117.

3) Tensile Strength and Elongation at Break

Based on the standard GB/T 1040. 1-2006, a strip membrane sample having a width of 25 mm is measured using electronic test equipment CMT4000 manufactured by MTS company.

4) Average Pore Size

Based on the standard IS015901. 1-2006 and under a pressure of 20-2000 Psi, a mercury porosimeter is employed to measure the pore distribution and the average pore size of the membrane.

5) Porosity

The pseudo-liquid density of the membrane (g/cm$^3$)=membrane weight/(thickness×area), the calculation result is divided by the theoretical value 0.93 g/cm$^3$, and 1 minus the obtained quotient represents the porosity of the membrane.

6) Thermal Shutdown Temperature, Thermal Contraction, and High Temperature Resistance Test The membrane is thermally pressed with a positive pole piece and then the two are clamped between smooth stainless steel plates. 0.35 MPa of static compressive stress is exerted along the thickness direction. The membrane is heated from 90 to 150° C. with a heating rate of 1° C./min. The membrane is maintained at 150° C. for 5 min and then cooled to room temperature. Thereafter, the Gurley value is measured, if exceeding 2000 s/100 cc, the thermal shutdown temperature of the membrane is considered to be less than 150° C. The membrane is heated from 90 to 150° C. with a heating rate of 1° C./min. The membrane is maintained at 150° C. for 5 min and then cooled to room temperature. Thereafter, the Gurley value is measured, and the physical appearance of the cooled membrane is observed intact. The longitudinal and transverse length of the membrane after thermal contraction is measured. Thermal contraction=(Initial length−length after thermal contraction)/Initial length×100%.

7) Peel strength

The bonding strength of the bonding body of the membrane and the positive pole piece is measured by a pulling test at 180°.

EXAMPLE 1

Formulas of the microporous membrane of a polyethylene-based composite material 20 parts by weight of ultrahigh molecular weight polyethylene (UHMWPE) having a weight average molecular weight of 1,500,000; 4 parts by weight of polyisobutylene (PIB) having a weight average molecular weight of 120,000 and Brookfield dynamic viscosity of 150 Pa·S at 100° C.; 80 parts by weight of dioctyl sebacate; and 0.5 part by weight of the antioxidant 1010.

Method for Preparation of the Microporous Membrane

1) Compounding and piece casting: 4 parts by weight of polyisobutylene (PIB) and 20 parts by weight of dioctyl sebacate were kneaded at 120° C. by a kneading machine for 2 hr to yield a hot melt adhesive A. 20 parts by weight of ultrahigh molecular weight polyethylene and 60 parts by weight of dioctyl sebacate were swelled and mixed at 105° C. in a vacuum stirring tank for 12 hr to yield a slurry B. The hot melt adhesive A and the slurry B were dispersed at 105° C. in the vacuum stirring tank for 5 hr. Thereafter, the resulting mixture was fed into a parallel co-rotating twin-screw extruder (CRTSE) having a length/diameter ratio of 1:52 via a metering pump for melting and milling. The temperature of the extruder was controlled in the range of 175-210° C. The melt was extruded from a flat die to produce casting pieces which were cooled quickly using three-roll cooling process. The first roller was a cooling compression roller, the second roller was a secondary cooling roll, and the third roller was a main cooling roll. The melt was introduced at zero angle between the first and the second rollers. One side of the melt was cooled by the second roller with an angle of contact of 90°, and the other side of the melt was cooled by the third roller with an angle of contact of 180°. The resulting casting pieces had a thickness of 1.5 mm.

2) Synchronous bi-directional hot stretch: the casting pieces were preheated at a temperature of between 115 and 125° C. and stretched in two directions, the longitudinal stretching ratio was 5 folds, and the transverse stretching ratio was 3 folds.

3) Liquid phase extraction under high pressure: the rolled products were washed in an extraction kettle. The washing temperature was 55° C., the washing pressure was 4.0 MPa, the separation pressure was 1.5-1.8 MPa, the separation temperature was 65° C., and the extraction solvent was R125. The washing was carried out cyclically in the system.

4) Thermal stretching step by step: the obtained semi-products of the membrane were preheated at a temperature of between 115 and 125° C. and stretched in two directions, the longitudinal stretching ratio was 1.3 folds, and the transverse stretching ratio was 1.5 folds; and the stretching temperature was 125° C.

5) Thermal shaping: the transversely stretched membrane was maintained for 20-40 seconds at 120-128° C.

6) Cooling and winding: the thermally shaped membrane was cooled to 40° C. and wound to yield the microporous membrane of a polyethylene-based composite material.

The characteristics of the membrane are summarized as follows:

Thickness: 30 μm; average pore size: 160 nm; porosity: 55%; Gurley value: 95 s/100 cc; tensile strength: machine direction (MD), 118 MPa, transverse direction (TD), 75 MPa; longitudinal elongation at break: 55%; transversal elongation at break: 173%; latent heat of fusion under DSC test: 176 J/g; melting point: 138° C. One side of the membrane at the side of the second roller was contacted with a negative pole piece of a battery, and the other side was contacted with a positive pole piece. Before injecting an electrolyte, the pole group of the battery was thermally pressed at 118° C. under a pressure of 1 MPa for 10 min. After cooling, the peel strength of the membrane and the positive pole piece was measured to be 0.1 N/20 mm. Thereafter, the thermal contraction of the membrane at 130° C. was measured. The physical appearance of the cooled membrane at room temperature was observed intact. The longitudinal and transverse thermal contraction rate of the membrane were both less than 8%. The Gurley value exceeded 2000 s/100 cc.

At the temperature of 80° C., 0.35 MPa of static compressive stress was exerted on the membrane along the through-thickness direction for 5 min. The membrane thickness was 24 μm. Five minutes later after the stress was released, the membrane thickness was measured to be 26 μm, and the Gurley value was 228 s/100 cc.

The membrane was dried and an electrolyte was injected to prepare a lithium ion battery which was tested with hot box, needling, short circuit, and squeezing at 150° C. 1C charge-discharge cycle at 25° C. was measured. The safety indexes of the battery were all qualified, and the cycle life was 1250 times.

COMPARATIVE EXAMPLE 1

The battery was prepared as that in Example 1 except that the membrane was a PP/PE/PP membrane prepared by a dry method. The membrane has a thickness: 25 μm; porosity: 40%; Gurley value: 600-630 s/100 cc; tensile strength: machine direction (MD), 165 MPa, transverse direction (TD), 13 MPa; transversal elongation at break: less than or equal to 15%.

1C charge-discharge cycle at 25° C. was measured, and the cycle life was 635 times. The safety indexes of needling and short circuit were qualified. After being placed in a hot box at 150° C. for 30 min, the battery was fired and exploded upon squeezing.

COMPARATIVE EXAMPLE 2

The battery was prepared as that in Example 1 except that the membrane was a PE membrane prepared by a wet method. The membrane has a thickness: 25 μm; porosity: 49%; Gurley value: 185 s/100 cc; tensile strength: machine direction (MD), 143 MPa, transverse direction (TD), 21 MPa; longitudinal elongation at break: 42%; transversal elongation at break: 344%.

1C charge-discharge cycle at 25° C. was measured, and the cycle life was 876 times. The safety index of needling was qualified. And the short circuit and hot box tests at 150° C. were disqualified.

The invention claimed is:

1. A membrane, consisting of polyethylene and a modifying agent, wherein:
    the modifying agent is distributed in the polyethylene, accounts for 10-25 wt. % of the membrane and is a rubber selected from polyisobutylene (PIB), ethylene-propylene methylene copolymer (EPM), or a mixture thereof, the rubber having a dynamic viscosity of between 50 and 2000 Pa·s at 100° C. and a weight average molecular weight of between 90,000 and 250,000;
    pores on one side of the membrane are smaller in size than pores on the other side; and
    the membrane has a latent heat of fusion of between 150 and 195 J/g, a fusion point of between 133 and 145° C., an average pore size of between 80 and 300 nm, a porosity of between 40 and 75%, an initial Gurley value of between 30 s/100 cc and 400 s/100 cc, a thickness of between 20 and 50 μm, a longitudinal tensile strength of exceeding 70 MPa, and a transversal elongation at break of exceeding 100%.

2. The membrane of claim 1, wherein a latent heat of fusion of the polyethylene is between 200 and 250 J/g, and a weight average molecular weight of the polyethylene is between 500,000 and 5,000,000.

3. The membrane of claim 1, wherein the rubber is polyisobutylene (PM) having a dynamic viscosity of between 150 and 1000 Pa·s at 100° C. and a weight average molecular weight of between 120,000 and 200,000.

4. The membrane of claim 1, wherein the rubber is ethylene-propylene methylene copolymer (EPM) having a dynamic viscosity of between 120 and 900 Pa·s at 100° C. and a weight average molecular weight of between 120,000 and 200,000.

5. The membrane of claim 1, wherein the polyethylene has a weight average molecular weight of between 1,000,000 and 3,000,000.

6. The membrane of claim 1, wherein the membrane has a thickness of between 25 and 35 μm and a porosity of between 50 and 65%.

7. A method for preparing the membrane of claim 1 using a thermally induced phase separation technology, the method employing polyethylene as a base material, employing amorphous polyisobutylene (PIB) rubber and/or ethylene-propylene methylene copolymer (EPM) rubber which are compatible with polyethylene to provide thermos-compression bonding capacity, employing an aliphatic dibasic acid ester having a flash point of exceeding 210° C. and being selected from dioctyl sebacate (DOS), dioctyl azelate (DOZ), diisodecyl adipate (DIDA), or a mixture thereof as a compatibilizer, controlling different cooling velocity of two opposite sides of casting pieces to yield the membrane, and the method comprising:
    1) uniformly milling the rubber and the compatibilizer at 90-120° C. to yield a hot melt adhesive A;
    2) swelling and stirring polyethylene and the compatibilizer at 90-120° C. for 1-24 hr to yield a slurry B;

3) uniformly mixing the hot melt adhesive A and the slurry B at 90-120° C., quantitatively feeding a resulting mixture to a twin screw extruder via a metering pump, milling at 180-210° C. to yield a thermodynamically uniform solution, and extruding the uniform solution to yield casting pieces;

4) quickly cooling the casting pieces on chill rolls using an asymmetric cooling process, controlling a winding length of one surface of the casting pieces on a secondary chill roll to be smaller than that of the other surface of the casting pieces on a main chill roll, or controlling temperatures and flow rates of a cooling medium in the main and secondary chill rollers to be different;

5) preheating the cooled casting pieces at 105-128° C. and thermally stretching the casting pieces in two directions to form a membrane, a longitudinal stretching ratio being 4-7 folds, and a transverse stretching ratio being 2-6 folds;

6) extracting and removing the compatibilizer using a solvent; and 7) thermally stretching the membrane for the adjustment of porosity, pore size, and thickness thereof, thermally shaping, and cooling to yield the membrane.

8. A lithium ion battery, comprising a positive pole piece, a negative pole piece, an electrolyte, and the membrane of claim 1, wherein, prior to injecting the electrolyte, a pole group of the battery comprising the positive pole piece, the negative pole piece, and the membrane is thermally pressed at a temperature of between 110 and 125° C. under a pressure of between 1 and 2.5 MPa for between 1 and 15 min.

9. The membrane of claim 1, wherein the membrane is prepared through a method comprising:

1) uniformly milling the rubber and a compatibilizer at 90-120° C. to yield a hot melt adhesive A, wherein the compatibilizer is dioctyl sebacate (DOS), dioctyl azelate (DOZ), diisodecyl adipate (DIDA), or a mixture thereof;

2) swelling and stirring polyethylene and the compatibilizer at 90-120° C. for 1-24 hr to yield a slurry B;

3) uniformly mixing the hot melt adhesive A and the slurry B at 90-120° C., feeding a resulting mixture to a twin screw extruder via a metering pump, milling at 180-210° C. to yield a thermodynamically uniform solution, and extruding the uniform solution to yield casting pieces;

4) quickly cooling the casting pieces on chill rolls, controlling a winding length of one surface of the casting pieces on a secondary chill roll to be smaller than that of the other surface of the casting pieces on a main chill roll, or controlling temperatures and flow rates of a cooling medium in the main and secondary chill rollers to be different;

5) preheating the cooled casting pieces at 105-128° C. and thermally stretching the casting pieces in two directions to form a membrane;

6) extracting and removing the compatibilizer using a solvent; and 7) thermally stretching the membrane for the adjustment of porosity, pore size, and thickness thereof, thermally shaping, and cooling to yield the membrane.

* * * * *